March 19, 1963

W. R. DAYEN ET AL 3,081,571

METHOD OF DECORATING HEAT SHRINKABLE, IRRADIATED, BIAXIALLY
ORIENTED POLYETHYLENE

Filed Sept. 18, 1959

INVENTORS
WILLIAM R. DAYEN
JOHN W. HARRISON
LEE W. KELLER

BY Cushman, Darby & Cushman

ATTORNEYS

United States Patent Office 3,081,571
Patented Mar. 19, 1963

3,081,571
METHOD OF DECORATING HEAT SHRINKABLE, IRRADIATED, BIAXIALLY ORIENTED POLYETHYLENE
William R. Dayen, Clinton, Iowa, John W. Harrison, Winchester, Mass., and Lee W. Keller, Taylors, S.C., assignors to W. R. Grace & Co., Cambridge, Mass., a corporation of Connecticut
Filed Sept. 18, 1959, Ser. No. 840,966
1 Claim. (Cl. 41—26)

This invention relates to heat shrinking biaxially oriented films.

It is an object of the present invention to thermally shrink predetermined areas of oriented shrinking film.

Another object is to obtain novel decorative effects by imparting colors to heat shrinking biaxially oriented films.

A further object is to spot weld plural layers of heat shrinking biaxially oriented films.

An additional object is to prepare biaxially oriented irradiated polyethylene film having a printing or a design thereon which is shrunk to exact scale.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The invention will best be understood in connection with the accompanying drawings wherein.

In the illustrative examples there was employed Alathon 14 film (polyethylene molecular weight about 20,000, density 0.916) which had been irradiated to an extent of 12 megarad and had then been stretched 350% longitudinally and 350% laterally and had a shrink energy of 250 p.s.i. at 96° C.

Figure 1:
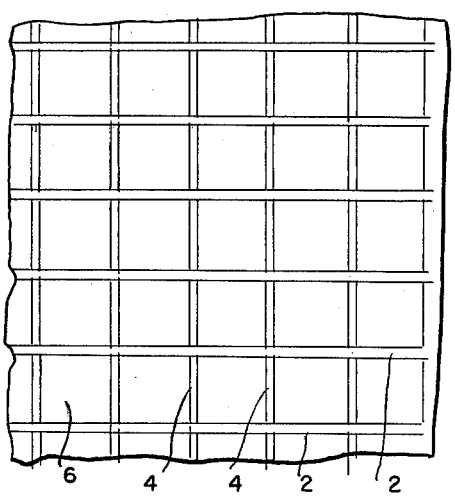
FIGURE 1 is a partial top plan view of a sheet of irradiated biaxially oriented polyethylene treated in accordance with the invention.
Figure 3:
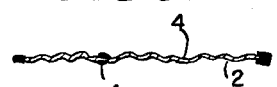
FIGURE 3 is a vertical section of the sheet of FIGURE 1.
Figure 5:
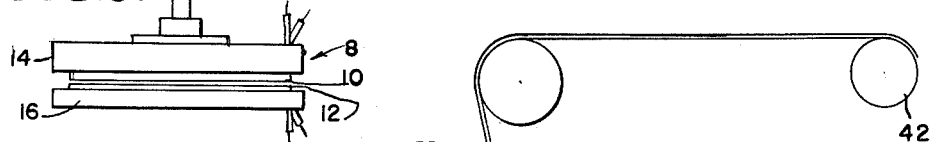
FIGURE 5 is a side elevation of a heated pressure sealer suitable for use in the invention.

Referring more specifically to FIGURES 1 and 3 of the drawings a waffle grid pattern composed of parallel narrow bands 2 and other narrow bands 4 perpendicular to bands 2 was formed on irradiated biaxially oriented polyethylene film 6 by applying heat with an impulse sealer 8 (FIGURE 5) for ¾ second. The application of the heat resulted in the quick release from tension in the places where heat was applied, namely the waffle grid. The impulse sealer (specifically a Cryovac 6207 impulse sealer) applies light unit pressure by means of resistance wires 10 and 12 on the face of insulated clamping jaws 14 and 16. The resistance wires receive a timed pulse of electricity and thus can be heated for brief periods of time. The jaws can be held closed or released when the heat pulse is finished. The areas which have received the heat are thicker and stronger than the balance of the film and are elastic in character.

In place of the waffle grid other patterns such as lines, scrolls, hob-nails, etc. can be imparted to the polyethylene film. Release of the tension by the use of heat can be complete or if the film is partially restrained then only partial release will occur.

Figure 2:
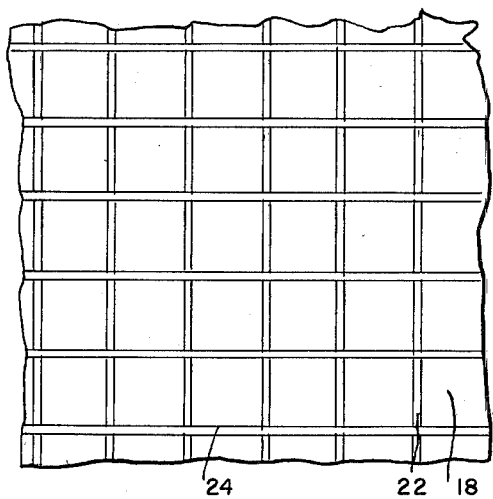
FIGURE 2 is a partial top plan view of two sheets of irradiated biaxially oriented polyethylene spot welded in accordance with the invention.
Figure 4:
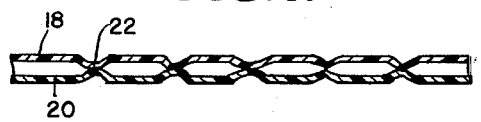
FIGURE 4 is a vertical section of the sheet of FIGURE 2.

The present invention can also be employed to spot weld two or more sheets of the irradiated biaxially oriented film. This phase of the invention is shown in FIGURES 2 and 4. The heat sealing is accomplished using an impulse sealer in the manner just set forth but a slightly longer heating time was employed, namely 2 seconds. As a result of the controlled heating and resulting shrinking top polyethylene sheet 18 and bottom polyethylene sheet 20 were spot welded in the narrow bands 22 and also narrow bands 24 perpendicular to the bands 22.

Figure 6:
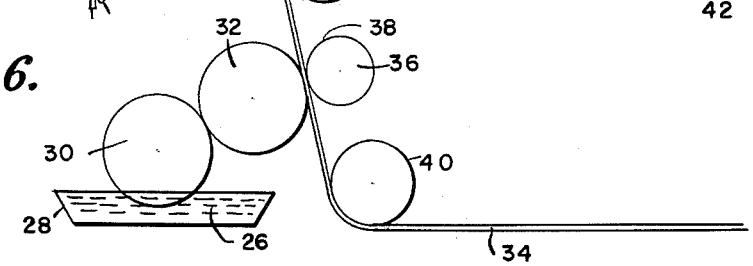
FIGURE 6 is a schematic illustration showing one method of imparting a design to heat shrinkable film in accordance with the invention.

It is also possible according to the invention to impart color to the surface which is to be selectively shrunk. Thus as shown in FIGURE 6 a polyethylene ink 26 (e.g. International Printing Ink Company Blue NOX 6987) in color dispenser 28 can be transferred via transfer roll 30 to coat the raised design portion of heated revolving roll 32. The color is then transferred to the irradiated biaxially oriented polyethylene film 34 by contact with the raised design to roll 32. The film is pressed against the design roll by roll 36 which has a slightly resilient surface 38. Any suitable means may be provided to move the film between the rollers 32 and 36 so as to permit shrinkage to take place during the heating. Preferably the film is supplied by an overfeed roll 40 and is subsequently wound on take-up roll 42, the rotative speed of which is less than the feed roll 40 and the amount less corresponding to the shrinkage. In this procedure the shrinkage is confined substantially to those areas which have the color imprinted thereon. These areas which have been "kissed" by the heat are thickened and are elastic in nature. The shrink can be complete or can be partially restrained, e.g. by proper regulation of the overdrive.

The selective shrinking can be for purely decorative effects or can be employed to make bulk film, physical shock resistant film such as liquid cargo container for air-drops, etc.

Figure 7:
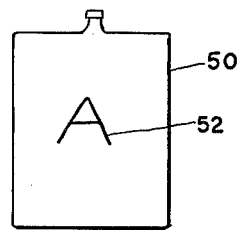
FIGURE 7 is a side elevation of a printed bag of irradiated biaxially oriented polyethylene.
Figure 8:
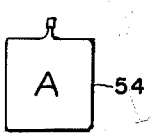
FIGURE 8 is a side elevation of the bag of FIGURE 7 after shrinking.

In another aspect of the invention as shown in FIGURES 7 and 8 the irradiated biaxially oriented polyethylene in the form of a bag 50 having a decorative design 52 printed thereon is heated to shrink the bag to the smaller bag 54 having the design likewise reduced but of excellent clarity with every detail of the design remaining intact.

As the polyethylene film there can be used films (or tubing) which has been irradiated to an extent of 6 to 20 megarad. The irradiation can be accomplished in conventional fashion, e.g., by the use of a high voltage resonant transformer, such as the 2,000,000 volt General Electric Resonant Transformer, or high energy particle generators of 20,000 to 50,000,000 volts or a Van de Graaff electron generator. In addition to the use of electrons, there can be employed beta rays, gamma rays, e.g. by employing cobalt 60, etc. There can be employed any of the irradiation procedures disclosed in Baird application, Serial No. 713,848, filed February 7, 1958, now United States Patent 3,022,543 or in Rainer Patent 2,877,500. The entire disclosures of the Baird application and Rainer patent are hereby incorporated by reference.

The biaxial orientation is normally carried out to an extent of 100 to 700% longitudinally and 100 to 900% laterally. The biaxial stretching can be carried out by blowing irradiated polyethylene tubing as disclosed in the Baird application or by calendering as disclosed in the Rainer patent. The irradiated, biaxially oriented polyethylene prepared by such a procedure has a high shrink energy, e.g. 100 to 1,000 p.s.i. at 96° C.

There can be employed as the starting polyethylene for the irradiation procedure high, low or medium density polyethylene prepared by low or high pressure technique. The starting polyethylene can have a molecular weight of 7,000 or 12,000 or 19,000 or 21,000 or 24,000 or 35,000 or even higher.

In place of irradiated polyethylene, there can be employed irradiated or unirradiated polypropylene but in such case higher temperatures are required for the heat shrinking.

The thicker and stronger cross section produced under the heating bar in a cross grid pattern as shown in FIGURE 1 will confine or stop a break or rip which may occur in the thinner sections of the film.

What is claimed is:

A method of imparting a decorative effect to heat shrinkable unitary, irradiated, biaxially oriented polyethylene film comprising simultaneously applying color to predetermined relatively small selected areas of the film while applying heat to the film substantially only in said selected areas while the film is under light pressure to heat shrink only said selected areas, said irradiation being to an extent of between 6 and 20 megarad and said shrunk areas being in thicker, stronger elastic condition.

References Cited in the file of this patent
UNITED STATES PATENTS

| | | |
|---|---|---|
| 2,037,539 | Robinson et al. | Apr. 14, 1936 |
| 2,538,025 | Moore | Jan. 16, 1951 |
| 2,621,139 | Messing | Dec. 9, 1952 |
| 2,689,378 | Muth et al. | Sept. 21, 1954 |
| 2,877,500 | Rainer et al. | Mar. 17, 1959 |
| 2,936,261 | Cole | May 10, 1960 |
| 2,966,439 | Sorel | Dec. 27, 1960 |
| 2,993,820 | Marshall | July 25, 1961 |

FOREIGN PATENTS

| | | |
|---|---|---|
| 771,234 | Great Britain | Mar. 27, 1957 |

OTHER REFERENCES

"Modern Packaging," March 1955, pp. 100–102.

Chemical Engineering, September 1955, "A New Material: Irradiated Polyethylene," pp. 228–234.

Modern Plastics, July 1955, "Treating Polyethylene for Printing," pp. 105, 106, 108 and 205.